United States Patent [19]

Okimoto et al.

[11] Patent Number: 4,484,556
[45] Date of Patent: Nov. 27, 1984

[54] SUPERCHARGE CONTROL MEANS FOR AN INTERNAL COMBUSTION ENGINE

[75] Inventors: Haruo Okimoto; Ikuo Matsuda, both of Hiroshima, Japan

[73] Assignee: Toyo Kogyo Co., Ltd., Hiroshima, Japan

[21] Appl. No.: 449,228

[22] Filed: Dec. 13, 1982

[30] Foreign Application Priority Data

Dec. 22, 1981 [JP] Japan .............. 56-192343[U]

[51] Int. Cl.³ .............................................. F02B 29/00
[52] U.S. Cl. ..................................... 123/432; 123/559
[58] Field of Search ............... 123/90.15, 432, 190 A, 123/308, 559, 564, 587, 213; 60/611

[56] References Cited

U.S. PATENT DOCUMENTS

| 1,578,581 | 3/1926 | Casna | 123/190 A |
| 4,315,489 | 2/1982 | Tadokoro et al. | 123/213 |

FOREIGN PATENT DOCUMENTS

| 54-45088 | 4/1979 | Japan . | |
| 54-45086 | 4/1979 | Japan . | |
| 156225 | 12/1980 | Japan | 123/432 |
| 153820 | 12/1980 | Japan | 123/213 |
| 519 | 1/1981 | Japan | 123/432 |
| 18022 | 2/1981 | Japan | 123/432 |
| 85522 | 3/1983 | Japan | 123/432 |

*Primary Examiner*—Ethel R. Cross
*Attorney, Agent, or Firm*—Fleit, Jacobson, Cohn & Price

[57] ABSTRACT

An internal combustion engine including a combustion chamber of which volume is cyclically changed in response to a rotation of the engine to effect a plurality of operating strokes including an intake stroke, an intake system including a main intake passage and an auxiliary intake passage both leading to the combustion chamber, a supercharger for providing a supply of supercharging gas to the auxiliary intake passage, a timing valve provided in the auxiliary intake passage between the combustion chamber and the supercharger, means for the timing valve being driven by the engine crankshaft for cyclically opening the auxiliary intake passage in synchronim with the rotation of the engine to allow the supercharging gas to pass to the combustion chamber, an electrically operated timing adjusting member for adjusting the opening timing of the valve, a timing control electrical circuit for controlling the adjusting member to determining the opening timing of the timing valve in accordance with a plurality of engine operating parameters.

5 Claims, 6 Drawing Figures

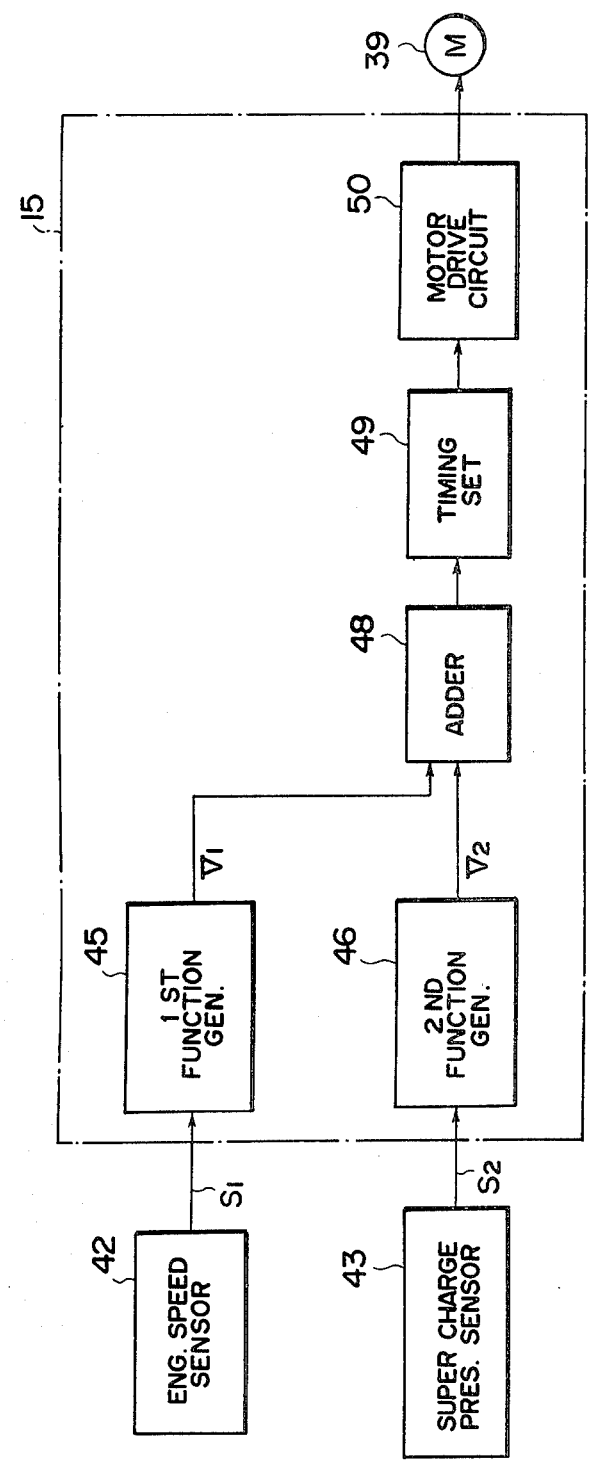

SUPERCHARGE CONTROL MEANS FOR AN INTERNAL COMBUSTION ENGINE

The present invention relates to supercharged internal combustion engines and more particularly to internal combustion engines having main intake passage means and auxiliary supercharging passage means.

Conventionally, it has been known to provide an engine with, in addition to a main intake passage, an auxiliary intake passage having a supercharger which is driven by the engine itself so that intake air is supplied under pressure to the engine under the engine load beyond a predetermined value. This arrangement is considered as advantageous in that the supercharging air can be supplied satisfactorily even under a low speed engine operating condition.

It has also been proposed by the Japanese patent application No. 54-45086 which has been filed on Apr. 12, 1979 and disclosed for public inspection on Oct. 27, 1980 under the disclosure No. 55-137314 to provide a timing valve in the supercharging auxiliary passage so as to open the auxiliary passage cyclically to thereby effect the supercharging at the end period of the intake stroke. The Japanese patent application further proposes to advance the valve timing under an increased engine speed. The U.S. Pat. No. 4,315,489 issued on Feb. 16, 1982 shows a similar supercharging control system. In the proposed arrangement, a centrifugal mechanism is recommended as means for controlling the valve timing so that, although the control of the valve timing can be effected satisfactorily under the engine speed, it is quite difficult to effect such control under another parameter such as engine intake pressure.

It is therefore an object of the present invention to provide supercharge control means in which precise control can readily be effected under a plurality of control parameters.

Another object of the present invention is to provide electrical means for controlling the timing of the supercharge control valve.

According to the present invention, the above and other objects can be accomplished by an internal combustion engine including chamber means of which volume is cyclically changed in response to a rotation of the engine to effect a plurality of operating strokes including an intake stroke, an intake system including main intake passage means and auxiliary intake passage means both leading to said chamber means, supercharging means for providing a supply of supercharging gas to said auxiliary intake passage means, timing valve means provided in said auxiliary intake passage means between said chamber means and said supercharging means, means for actuating said timing valve means for cyclically opening said auxiliary intake passage means in synchronism with the rotation of the engine to allow the supercharging gas to pass to the chamber means electrically operated timing adjusting means for adjusting opening timing of said valve means, timing control electrical means for controlling said adjusting means to determining the opening timing of said timing valve means in accordance with a plurality of engine operating parameters. The present invention thus adopts electrically operated timing adjusting means for adjusting the opening timing of the timing valve means so that the opening timing of the valve means can readily be controlled under a plurality of engine operating parameters.

In a preferable mode of the present invention, the timing control electrical means is designed to receive an engine speed signal and a supercharging pressure signal so that the valve opening timing is advanced in response to an increase in the engine speed and the valve opening timing can be abruptly advanced when the supercharging pressure is increased beyond a predetermined level. By advancing the valve opening timing in response to an increase in the engine speed, it becomes possible to accomplish a satisfactory supercharging effect under a high engine speed simultaneously preventing blow back of supercharging gas to the main intake passage means under a low engine speed. Further, by advancing the valve opening timing abruptly when the supercharging pressure is increased beyond a predetermined value, it becomes possible to have the pressure in the auxiliary intake passage means relieved through said chamber means to the main intake passage means to thereby avoid an abnormal increase in the pressure in the auxiliary intake passage means which may possibly be encountered in case of a failure of pressure relief valve means provided in the same passage means.

In lieu of or in addition to the valve opening timing control under the supercharging pressure as described above, the valve opening timing may be steppedly advanced in response to an abnormal increase in the temperature of exhaust gas purifying means in exhaust system and/or when the engine knocking is sensed. The features of the present invention can be applied not only to a reciprocating piston engine but also to a rotary piston engine.

The above and other objects and features of the present invention will become apparent from the following descriptions of a preferred embodiment taking reference to the accompanying drawings, in which:

FIG. 4 is a block diagram showing the arrangement of the control circuit;

Figure 1:
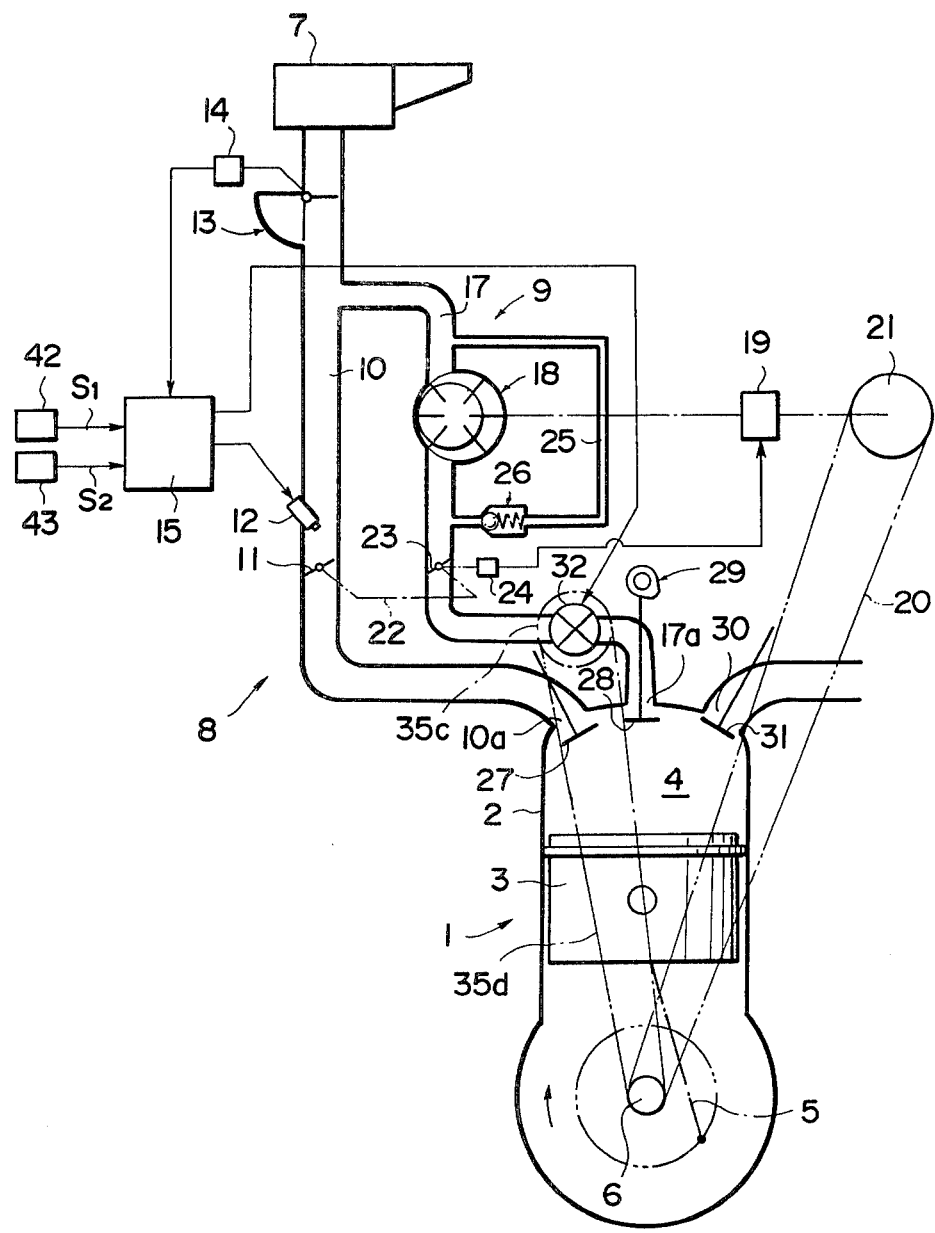
FIG. 1 is a diagrammatical view of a reciprocating piston engine having a supercharging control system in accordance with one embodiment of the present invention.

Referring now to the drawings, particularly to FIG. 1, there is shown an engine 1 which includes a cylinder 2 and a piston 3 disposed in the cylinder 2 for reciprocating movement. A combustion chamber 4 of variable volume is defined in the cylinder 2 above the piston 3. The piston 3 is connected by means of a connecting rod 5 to a crankshaft 6 so that the piston 3 is reciprocatingly moved in the cylinder 2 to change cyclically the volume of the combustion chamber 4.

The engine 1 further includes a main intake system 8 which has a main intake passage 10 connected at one end with an air cleaner 7 and at the other end with the combustion chamber 4 through a main intake port 10a. In the main intake passage 8, there is provided a main throttle valve 11 and a fuel injection valve 12 which is located upstream of the main throttle valve 11. The main intake passage 8 is also provided with an air-flow sensor 13 of a measuring plate type which is located at the upstream end portion of the passage 8 for detecting the air-flow to the combustion chamber 4. The air-flow sensor 13 is associated with a potentiometer 14 which produces an electric signal representing the air-flow to the combustion chamber 4. The air-flow signal from the potentiometer 14 is applied to a control circuit 15.

The engine 1 also has a supercharging system 9 which includes an auxiliary intake passage 17 connected at one end with the main intake passage 8 downstream of the air-flow sensor 13. The other end of the auxiliary intake passage 17 is connected through an auxiliary intake port 17a with the combustion chamber 4. The main and auxiliary intake ports 10a and 17a are respectively provided with a main and auxiliary intake valves 27 and 28. The auxiliary intake valve 28 is cyclically opened by a valve actuating cam 29. Although not shown in FIG. 1, a similar cam is also provided to actuate the main intake valve 27. The auxiliary intake passage 17 is provided with a supercharger 18 in the form of an air pump which is connected through an electromagnetic clutch 19 with a pully 21. The pully 21 is connected with the crankshaft 6 through a belt 20 so that the supercharger 18 is driven by the engine crankshaft 6. The auxiliary intake passage 17 is provided downstream of the supercharger 18 with an auxiliary throttle valve 23 which is interconnected with the main throttle valve 11 so that the throttle valve 23 starts to open when the throttle valve 11 is opened beyond a predetermined value and increases its opening as the opening of the main throttle valve 11 is increased.

The auxiliary throttle valve 23 is associated with a throttle valve position sensor 24 which produces an output when the throttle valve 23 is moved from the closed position. The output of the sensor 24 is applied to the electro-magnetic clutch 19 so that the clutch 19 is engaged whenever the throttle valve 23 is opened to thereby drive the supercharger 18. There is provided a bypass passage 25 which is connected at the opposite ends respectively with the auxiliary intake passage 17 upstream and downstream of the supercharger 18. The passage 25 is provided with a pressure relief valve 26 which opens only toward the upstream side when the pressure downstream of the superchager 18 is increased beyond a predetermined value.

Downstream of the auxiliary throttle valve 23, the passage 17 is provided with a timing valve 32. The control circuit 15 receives an engine speed signal S1 from a speed sensor 42, and a supercharging pressure signal S2 from a pressure sensor 43, which represents the pressure in the auxiliary intake passage 17 between the supercharger 18 and the auxiliary throttle valve 23. The control circuit 15 functions to calculate an appropriate amount of fuel to be supplied to the engine based on the input signals applied thereto and produce a fuel injection signal which is applied to the fuel injection nozzle 12 to control it. Further, the control circuit 15 produces a timing signal which is applied to the timing valve 32 to determine the opening timing of the valve 32.

Figure 2:
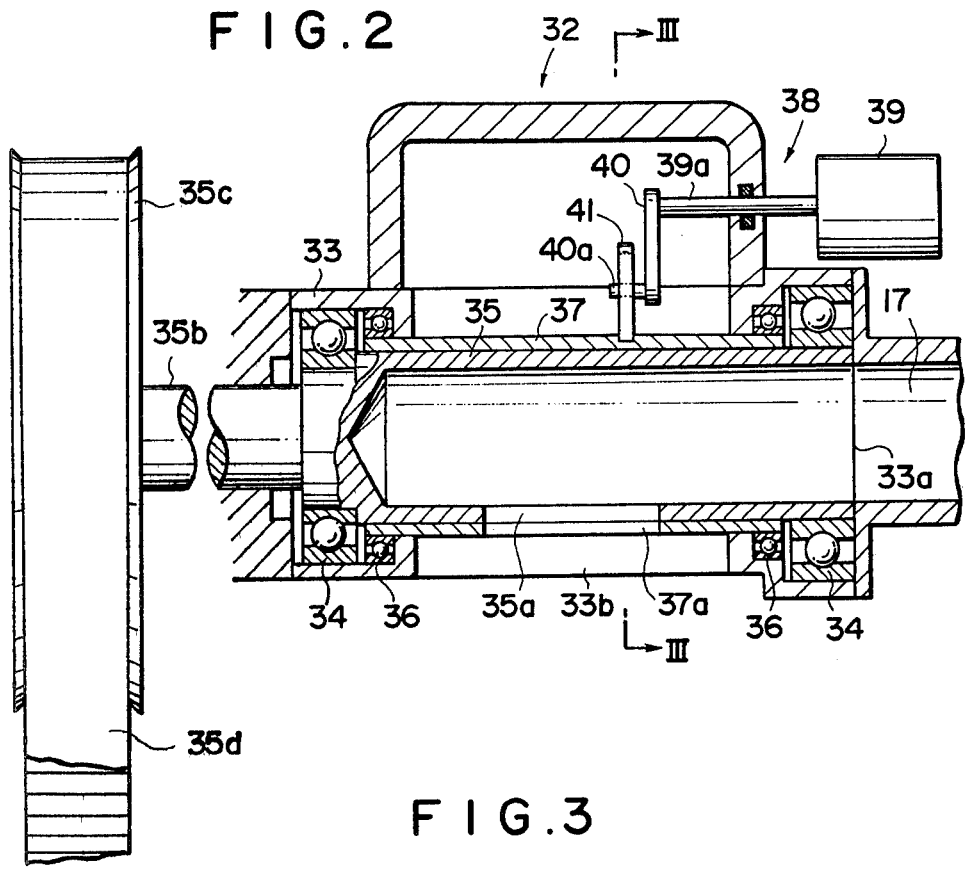
FIG. 2 is an axial sectional view of the timing valve control mechanism.
Figure 3:
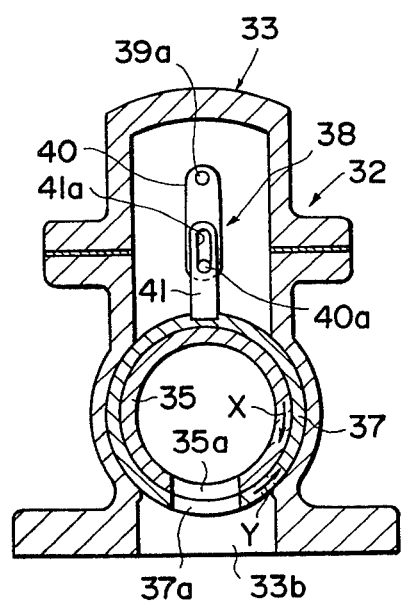
FIG. 3 is a sectional view taken substantially along the line III—III in FIG. 2.

Referring now to FIGS. 2 and 3, there are shown details of the timing valve 32. In FIG. 2, it will be noted that the timing valve 32 includes a casing 33 having an inlet opening 33a formed at one end wall and connected with the auxiliary inlet passage 17, and an outlet opening 33b formed at a side wall and opened to the auxiliary intake port 17a. In the casing 33, there is a cylindrical rotary valve member 35 which is rotatably supported by the casing 33 through bearing 34. The valve member 35 has one axial end which is opened and in communication with the inlet opening 33a of the casing 33. The other axial end of the valve member 35 is closed and an opening 35a is formed in the side wall. The closed end of the valve member 35 is axially extended beyond the bearing 34 to form a drive shaft 35b which is provided with a toothed pully 35c. The pully 35c is engaged with a toothed timing belt 35d which is in turn engaged with the engine crankshaft 6 so that the valve member 35 is rotatably driven by the engine crankshaft 6 in synchronism therewith to thereby bring the opening 35a cyclically in communication with the outlet opening 33b in the casing 33.

A cylindrical sleeve 37 is provided around the valve member 35 and supported by the casing 33 for rotation by bearings 36. The sleeve 37 has an opening 37a which cooperates with the opening 35a of the valve member 35 to control the valve opening timing. More specifically, as the valve member 35 rotates as shown by an arrow X in FIG. 3, the timing valve 32 is opened when the leading edge of the opening 35a comes to an edge of the opening 37a in the sleeve 37. When the sleeve 37 is rotated for a certain angle in the direction shown by an arrow Y in FIG. 3, the valve opening timing will be advanced.

There is provided a valve timing adjusting mechanism 38 which includes a servomotor 39 adapted to be operated by the output from the control circuit 15. The servomotor 39 has an output shaft 39a which is connected with a swingable arm 40 having a pin 40a provided at its free end. The sleeve 37 has an actuating lever 41 which has an elongated slot 41a. The pin 40a on the arm 40 is engaged with the slot 41a in the lever 41 so that when the arm 40 is swung clockwise by the servomotor 39 the sleeve 37 is rotated in the direction shown by the arrow Y to advance the valve opening timing. The circumferential widths of the openings 35a and 37a are determined so that the timing valve 32 is closed after the auxiliary intake valve 28 is closed.

Figure 5A:
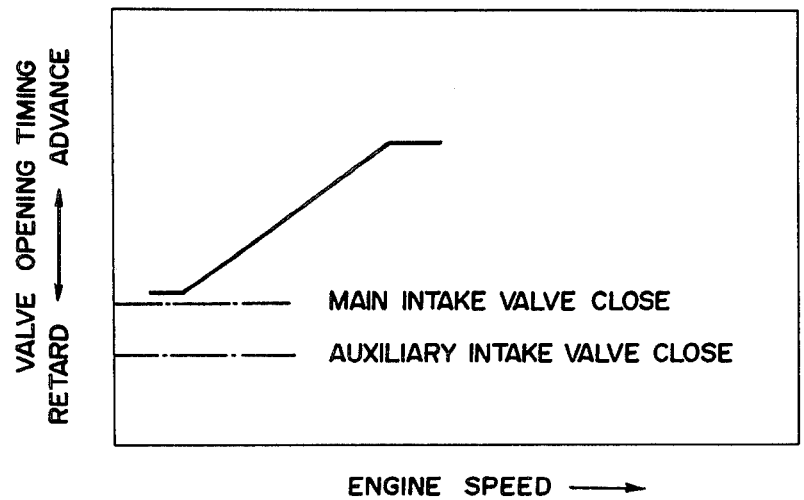
FIG. 5(a) is a diagram showing one example of control of the valve opening timing in accordance with the engine speed; and, FIG. 5(b) is a diagram showing one example of control of the valve opening timing in accordance with the supercharging pressure.

Referring now to FIG. 4, there is shown the arrangement of the control circuit 15. The control circuit 15 includes a first function generator 45 which receives the engine speed signal S1 from the sensor 42 and a second function generator 46 which receives the supercharging pressure signal S2 from the sensor 43. The first function generator produces a first voltage signal V1 which increases in proportion to an increase in the engine speed signal S1 as shown in FIG. 5(a) whereas the second function generator 46 produces a second voltage signal V2 which increases abruptly as shown by a solid line in FIG. 5(b) when the supercharging pressure signal S2 increases beyond a value $P_0$ which represents a limit of normal supercharging pressure and decreases abruptly as shown by a phantom line in FIG. 5(b) when the signal S2 is decreased below a value $P_1$ which is lower than the value $P_1$. The signals V1 and V2 are applied to an adding circuit 48 which has an output connected with a valve opening timing setting circuit 49. The setting circuit 49 functions to convert the voltage signal from the adding circuit 48 into a pulse signal and the output of the setting circuit 49 is applied to a motor driving circuit 50 which produces an output for driving the servomotor 39 for an angle corresponding to the signal from the circuit 49. Thus, the servomotor 39 is rotated by an angular extent corresponding to the output of the motor driving circuit 50. Although not shown in FIG. 4, it should of course be noted that the control circuit 15 has a fuel metering section which produces a signal for controlling the fuel injection nozzle 12. Such a circuit is well known in the art so that detailed descriptions will not be made.

In operation, as far as the engine load is low and the opening of the main throttle valve 11 is below a predetermined value, the auxiliary throttle valve 23 is in the closed position so that the electromagnetic clutch 19 is disengaged. The engine is therefore supplied with intake gas only through the main intake passage 10.

When the main throttle valve 11 is opened beyond the predetermined value, the auxiliary throttle valve 23 is also opened so that the clutch 19 is engaged and the supercharger 18 is operated. Thus, the supercharging air is supplied to the combustion chamber 4. The timing of supplying the supercharging air is controlled by the timing valve 32 as described previously. Under a low speed operation of the engine, it is preferable to open the timing valve 32 only at the end period of the intake stroke because, through this control, it becomes possible to minimize the blow-back of the supercharged air to the main intake passage 10. As the engine speed increases, the servomotor 39 is operated to rotate the sleeve 37 in the direction shown by the arrow Y in FIG. 3 so that the valve opening timing is advanced in response to an increase in the engine speed as shown in FIG. 5(a). Thus, it is possible to obtain an increased supercharging effect under a high speed operation of the engine. Under a high speed, the blow-back of the supercharged air to the main intake passage 10 is unlikely to occur so that it is advantageous to advance the valve opening timing.

Figure 5B:
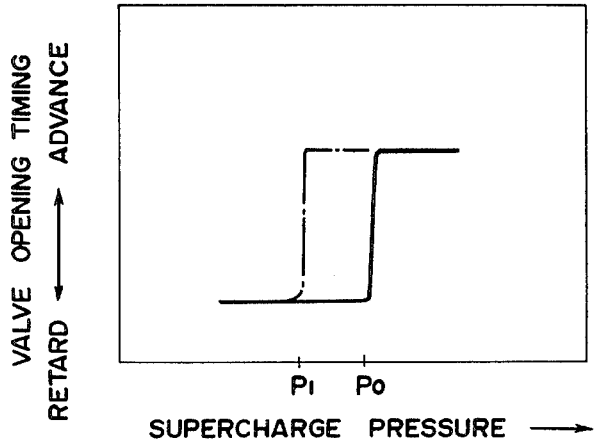

When the supercharging pressure, that is, the pressure in the auxiliary passage 17 between the supercharger 18 and the throttle valve 23 is increased beyond the valve $P_0$ due for example to a sticking of the relief valve 26, the valve opening timing is abruptly advanced as shown in FIG. 5(b). Thus, there will be produced an increased amount of blow-back to the main intake passage 10 to thereby prevent an abnormal increase of the pressure in the combustion chamber 4. Due to the hysterisis of the output of the second function generator 46, it is possible to prevent hunting movement of the sleeve 37.

In the illustrated embodiment, the engine 1 is provided with a injection type fuel supply system which is preferable in embodying the present invention, however, the present invention can also be applied to an engine having a carburetor type fuel supply system. In such a case, the carburetor must be located upstream of the point where the auxiliary intake passage 17 is branched from the main intake passage 10. Such an arrangement may have a disadvantage in that the supercharger is contaminated by fuel.

In the embodiment shown in FIG. 1, the auxiliary intake passage 17 may be provided with a fuel injection nozzle. In an alternative arrangement, the electromagnetic clutch 19 between the engine-driven pulley 21 and the supercharger 18 may be omitted and the relief valve 26 in the bypass passage 25 may be substituted by a control valve which is opened to relieve the air from the supercharger 18 when the auxiliary throttle valve 23 is closed.

It should further be noted that the throttle position sensor 24 may not necessarily be associated with the auxiliary throttle valve 23 but it may be arranged so as to detect the position of the main throttle valve 11.

The invention has thus been shown and described with reference to a specific embodiment, however, it should be noted that the invention is in no way limited to the details of the illustrated structures but changes and modifications may be made without departing from the scope of the appended claims.

We claim:

1. An internal combustion engine including chamber means of which volume is cyclically changed in response to a rotation of the engine to effect a plurality of operating strokes including an intake stroke, an intake system including main intake passage means and auxiliary intake passage means both leading to said chamber means, supercharging means for providing a supply of supercharging gas to said auxiliary intake passage means, timing valve means provided in said auxiliary intake passage means between said chamber means and said supercharging means, means for actuating said timing valve means for cyclically opening said auxiliary intake passage means in synchronim with the rotation of the engine to allow the supercharging gas to pass to the chamber means, electrically operated timing adjusting means for adjusting opening timing of said valve means, timing control electrical means for controlling said adjusting means to determining the opening timing of said timing valve means in accordance with a plurality of engine operating parameters.

2. An engine in accordance with claim 1 in which said engine operating parameters include an engine speed and an engine abnormal signal which represents that an abnormal condition is produced in the engine, said timing control electrical means including first means for producing a first signal which changes in response to a change in engine speed and second means for producing a second signal which changes abruptly when said abnormal condition is detected.

3. An engine in accordance with claim 1 in which said timing valve means includes a rotary valve comprising a hollow cylindrical valve member having a cylindrical wall formed with opening means, means being provided for drivingly connecting said valve member with engine output shaft means so that the former is driven by the latter, said timing adjusting means including an adjusting member having adjusting opening means for cooperation with said opening means in the valve member to open said auxiliary intake passage means and means for moving said adjusting member circumferentially of the valve member.

4. An engine in accordance with claim 3 in which said adjusting member is a cylindrical sleeve fitted to said valve member.

5. An engine in accordance with claim 2 in which said second means is connected with a supercharging pressure sensor so that said second signal is produced when supercharging pressure is increased beyond a predetermined value.

* * * * *